United States Patent [19]

Lanzillotta et al.

[11] Patent Number: 5,781,333
[45] Date of Patent: Jul. 14, 1998

[54] PIEZOELECTRIC LIGHT SHUTTER

[76] Inventors: John Lanzillotta, 3113 N. Trinidad St., Arlington, Va. 22213; Kevin Wimsatt, 1753 Christiana Dr., Gamber, Md. 21048

[21] Appl. No.: 699,870

[22] Filed: Aug. 20, 1996

[51] Int. Cl.$^6$ .................................... G02F 1/29
[52] U.S. Cl. .................... 359/316; 359/290; 359/297
[58] Field of Search ........................ 359/316, 290, 359/297

[56] References Cited

U.S. PATENT DOCUMENTS

| | | |
|---|---|---|
| 3,553,364 | 1/1971 | Lee. |
| 3,963,326 | 6/1976 | Buchert. |
| 4,564,836 | 1/1986 | Vuilleumier et al.. |
| 5,062,689 | 11/1991 | Koehler. |
| 5,078,479 | 1/1992 | Vuilleumier. |
| 5,121,249 | 6/1992 | Fellows ................... 359/316 |
| 5,455,709 | 10/1995 | Dula, III et al. .......... 359/245 |

*Primary Examiner*—Frank G. Font
*Assistant Examiner*—Reginald A. Ratliff
*Attorney, Agent, or Firm*—Myers Liniak & Berenato

[57] ABSTRACT

A piezoelectric actuatable array of light shutters is disclosed wherein each pixel aperture in the array is selectively opened and closed by way of an opaque piezoelectric shutter. Upon application of a voltage, each piezoelectric shutter extends laterally so as to close the corresponding pixel aperture and prevent light from passing therethrough. The pizeoelectric shutters contract, opening the corresponding pixel aperture, upon removal of the above-threshold voltage.

12 Claims, 4 Drawing Sheets

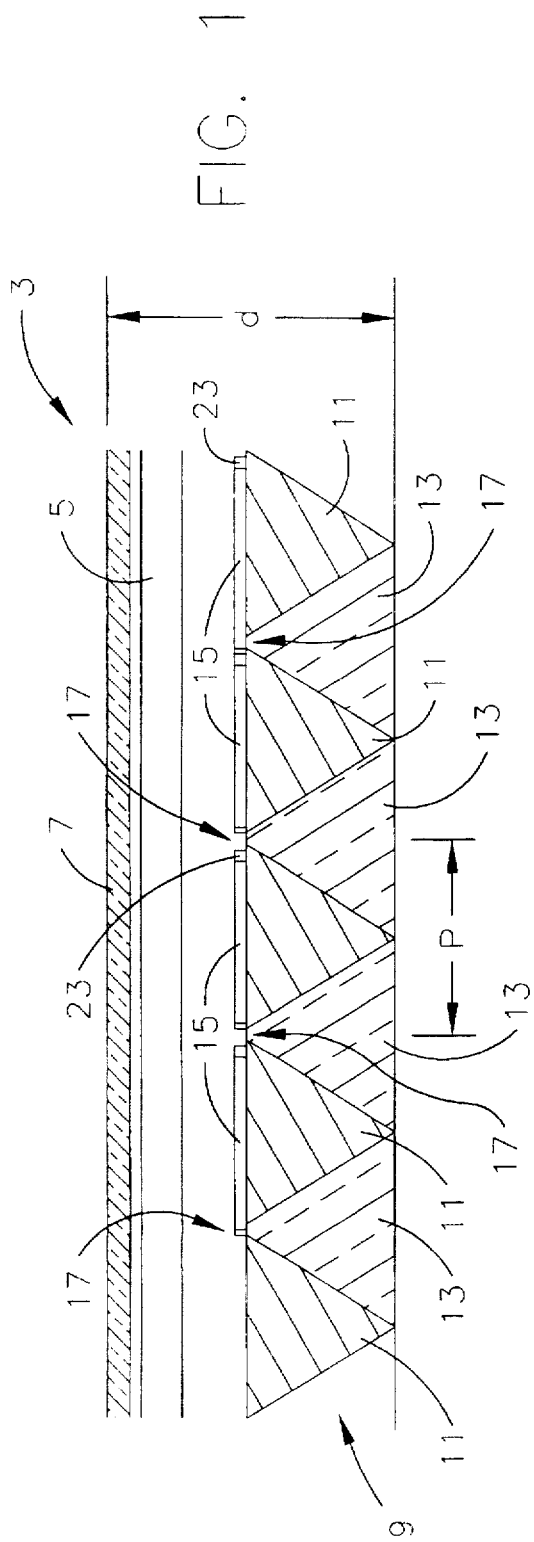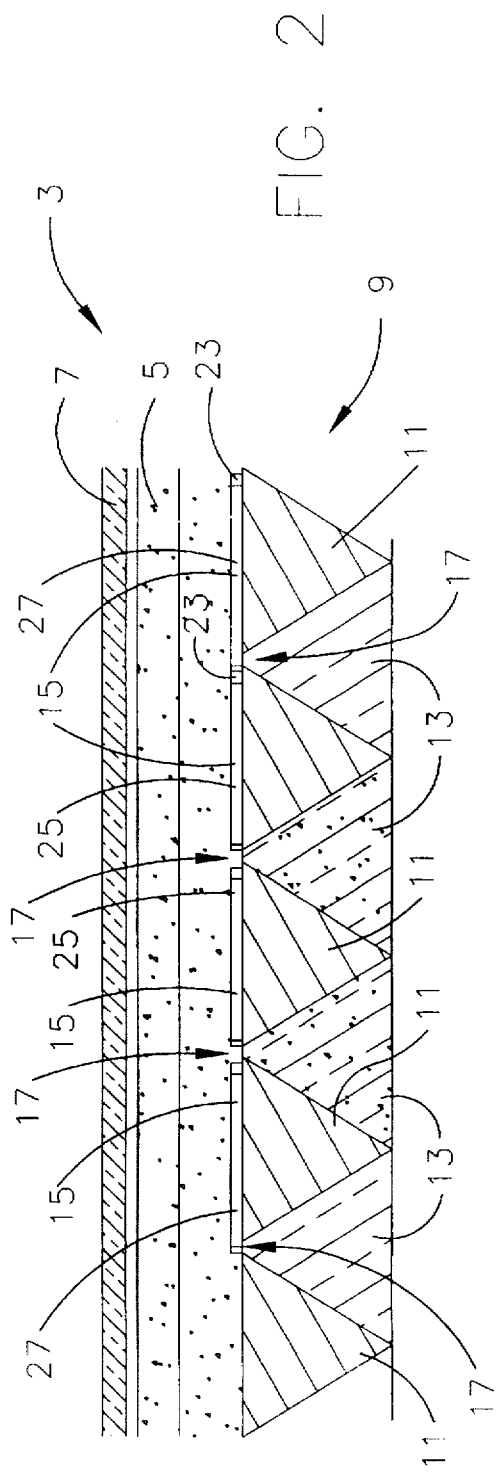

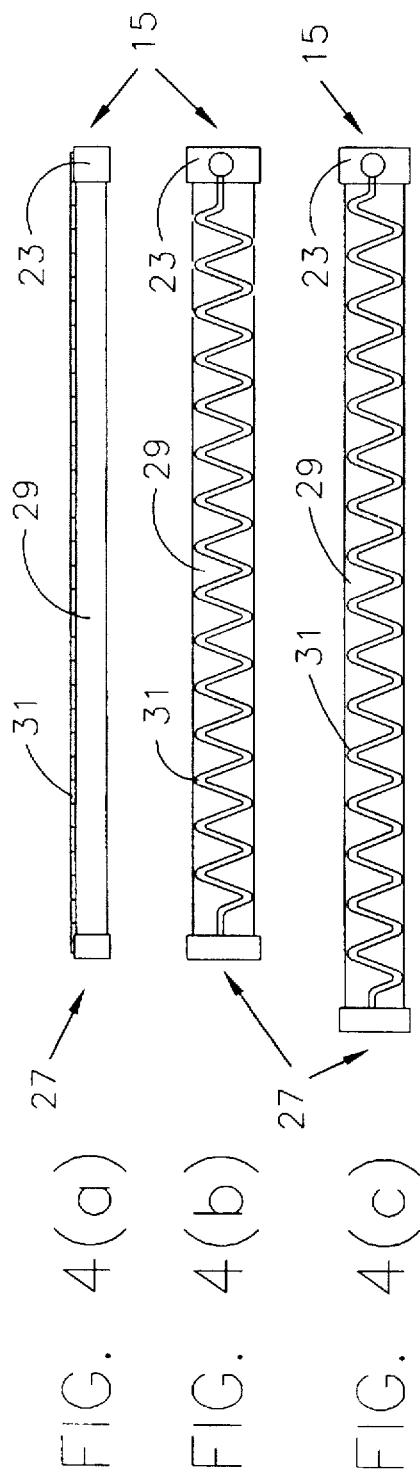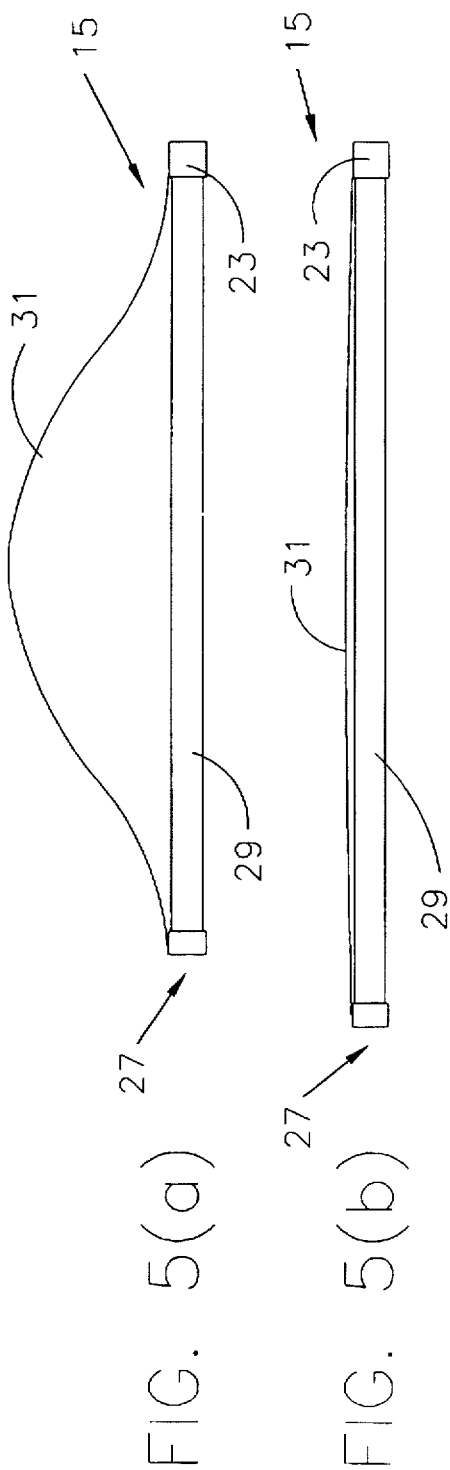

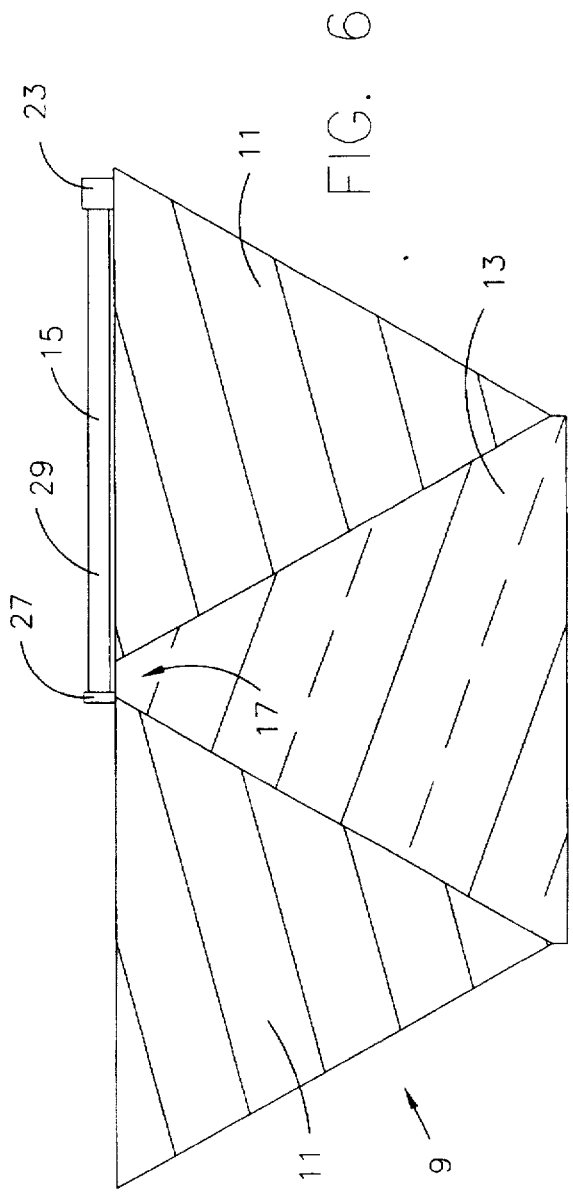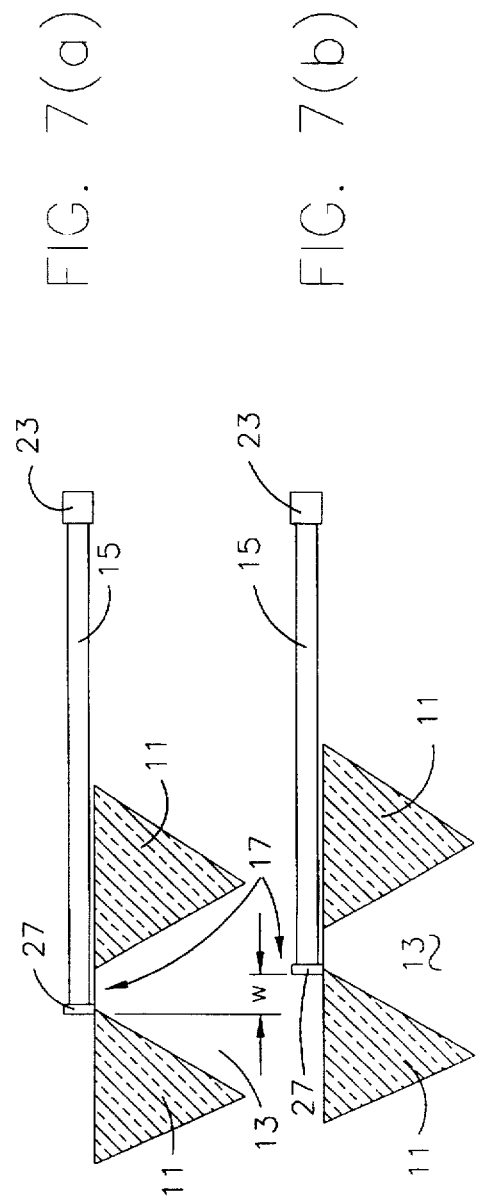

5,781,333

PIEZOELECTRIC LIGHT SHUTTER

This invention relates to a light shutter or light modulating device including an array of pixel apertures defined in or on a substrate. More particularly, this invention relates to a piezoelectric light shutter device wherein each pixel aperture in the array is selectively opened and closed by way of a piezoelectrically actuatable opaque shutter which moves laterally in its own plane across a corresponding pixel aperture as a function of the voltage applied thereto.

BACKGROUND OF THE INVENTION

Cathode ray tubes (CRTs) are the most common devices currently employed in televisions and other graphic display applications. However, this well-known scanning electron beam and light emitting phosphor technology suffers from the disadvantages that (i) high voltages are required; (ii) a large evacuated glass enclosure which is relatively expensive to manufacture is needed; (iii) the overall size or thickness of the device is less than desirable (i.e. it is too large); and (iv) pixels have finite refresh rates.

Liquid crystal displays (LCDs) are currently experiencing advancement in the marketplace in graphic display applications. LCDs require low driving voltages and operate in either reflective or transmissive modes. LCDs have an advantage over CRTs in that LCDs are relatively small in thickness and are suitable for laptop computers and the like. Unfortunately, liquid crystal displays have relatively low speeds as to their pixel-state changes and are very difficult to manufacture and thus currently very expensive.

In response to the disadvantages discussed above with respect to CRTs and LCDs, much research has been done in the area of light shutter devices including arrays of mechanically operable pixel apertures or openings. For example, see U.S. Pat. Nos. 3,963,326; 4,564,836; and 5,062,689, just to name a few.

U.S. Pat. No. 3,963,326 discloses a data display panel including a plurality of separately controllable pixel aperture openings selectively operated in order to provide image data to a viewer. In one embodiment of the '326 patent, a magnetic ball is selectively moved between a first position where it closes or blocks light from passing through a corresponding pixel aperture, and a second position spaced from the pixel aperture so that light is selectively permitted to pass through the aperture. The ball is caused to move back and forth between these two positions by way of a combination permanent magnet/coil. According to certain other embodiments of the '326 patent, an opaque shutter including a planar portion is controlled by way of an electromagnet so as to move laterally between a pixel aperture blocking position (closed position) and an open position where light transmission is permitted through the aperture.

Unfortunately, light shutter systems such as that disclosed in the '326 patent which utilize electromagnetic means for selectively opening and closing pixel apertures are susceptible to significant problems in environments including either permanent or periodic magnetic fields. In other words, if the light shutter device of the '326 patent were to be brought into an environment which, unbeknownst to the user, included a significant magnetic field, the shutter system could be rendered inoperable.

U.S. Pat. No. 4,564,836 discloses a light shutter device including an array of conductive shutters, each of which is pivotable between a closed position and an open position so as to selectively supply image data to a viewer. The device of the '836 patent relies upon springs and highly complex parts. When a control voltage is applied between the shutters on the one hand and the control electrode which is associated therewith on the other, the shutters move from their rest position, under the effect of the electric field produced by the control voltage, and rotate or pivot about a resilient attachment in order to take up a position in which they are oriented substantially perpendicular to the plane of the carrier. The angle through which the shutters turn depends upon both the strength of the electric field produced and the return torque produced by the resilient attachment when the shutters pivot. Unfortunately, this pivoting from a substantially flat position to a substantially perpendicular position upon the provision of voltage is undesirable in that it takes up valuable space and renders the system susceptible to damage when the shutters are "standing" perpendicular to the plane of the panel. This device is susceptible to chatter and vibration cross-talk as a result of limiters on the shutters.

U.S. Pat. No. 5,078,479 discloses a light modulating device including matrix addressing of cells. Each cell includes two flaps fixed to the substrate by flexible attachment, a control electrode, a row electrode, and a maintenance electrode. Each flap is rotatable between a rest position and an activated position. Unfortunately, the rest and activated positions achievable by the flaps of the '479 patent are perpendicular to one another thereby rendering the flaps susceptible to: damage when standing up, taking up an undesirably large amount of space, and metal fatigue at the pivot points. This device is also susceptible to cross-talk due to chatter and vibrations as a result of limiters.

U.S. Pat. No. 5,062,689 discloses a light shutter device including an opaque substrate patterned with an array of pixel apertures, each aperture in the array being selectively opened and closed by a shutter connected to a spring which moves laterally back and forth across the aperture. Unfortunately, the system of the '689 patent suffers from at least the following problems: (i) environments including large magnetic fields will create problems for the '689 device; (ii) metal fatigue of the springs attached to the opaque shutters may become a problem as time progresses; and (iii) elasticity of the springs of the '689 device is a function of temperature which is undesirable given the need to use such devices in a multitude of different environments (e.g. cockpits).

Additionally, many of the above-discussed patents are undesirable because of their complexity of parts and large displacement. Part complexity results in substantial manufacturing challenges and difficulties in repeatability, while large displacements present speed, impulse, momentum, chatter, and design difficulties.

In view of the above, it is apparent that there exists a need in the art for an improved mechanical light shutter device including an array of pixel openings which are more efficiently opened/closed in order to provide image data to a viewer. The improved device should overcome the problems discussed above such as the problem in the prior art of being susceptible to failure in environments including magnetic fields.

It is a purpose of this invention to fulfill the above described needs in the art, as well as other needs apparent to the skilled artisan from the following detailed description of this invention.

SUMMARY OF THE INVENTION

Generally speaking, this invention fulfills the above-described needs in the art by providing a piezoelectric transmissive light shutter device for controlling the transmission of light from a light source through an array of pixel apertures, the piezoelectric light shutter device comprising:

a light source for emitting visible light rays toward the array of pixel apertures;

a substrate supporting a plurality of opaque portions for blocking light and the array of pixel apertures for transmitting light, each pixel aperture in the array being defined between or within at least one of the opaque portions;

an array of piezoelectric opaque light shutters, each shutter including piezoelectric means for moving laterally in its plane for selectively opening and closing a corresponding pixel aperture, one of the piezoelectric opaque shutters being provided for each pixel aperture in the array so that light transmission from the source through a given pixel aperture is blocked when the corresponding shutter is in a closed position and permitted when the corresponding shutter is moved laterally in its plane to an opened position; and wherein each of the piezoelectric light shutters is selectively controlled between the opened and closed positions by way of the selective application of direct voltage to each piezoelectric light shutter.

According to certain preferred embodiments, each of the piezoelectric opaque shutters is substantially planar in design and includes a conductive circuit member extending longitudinally from end to end.

This invention still further fulfills the above-described needs in the art by providing a piezoelectric-actuated array of light shutters comprising:

an array of pixel apertures defined in or on a substrate;

piezoelectric shutter means operatively associated with each pixel aperture in the array; and wherein each of the piezoelectric shutter means includes a planar opaque member which moves laterally back and forth upon receiving application of voltage so as to selectively open and close the corresponding pixel aperture respectively.

The opened and closed states are directly controlled by the inherent properties of the material in the charged and uncharged state. Shutters act independent of any externally applied force such as magnetic fields or spring forces. The invention realizes reduced chatter and vibration cross-talk and is easily manufactured via etching. Reliability is improved due to parts simplicity and the device achieves high switching speeds in the MHz range.

This invention will now be described with reference to certain embodiments thereof as illustrated in the following drawings.

IN THE DRAWINGS

FIG. 1 is a side cross-sectional view of a piezoelectric light shutter device according to an embodiment of this invention, the device including a plurality of pixel apertures selectively opened/closed by piezoelectric shutters.

FIG. 2 is a side elevational cross-sectional view of the FIG. 1 embodiment, FIG. 2 further including the illustration of light rays passing through a pair of opened pixel apertures.

FIG. 4(a) is a side elevational view of a piezoelectric light shutter for use in the system of FIGS. 1–3, FIG. 4(a) illustrating the shutter in the contracted state.

FIG. 4(b) is a top elevational view of the FIG. 4(a) piezoelectric shutter, also in the contracted state.

FIG. 4(c) is a top elevational view of the FIG. 4(a)–4(b) shutter in the extended state when a voltage is applied to the piezoelectric circuit member extending lengthwise in the shutter.

FIG. 5(a) is a side elevational view of a piezoelectric opaque shutter according to another embodiment of this invention for use in the system of FIGS. 1–3, FIG. 5(a) illustrating the shutter in its contracted state.

FIG. 5(b) is a side elevational view of the FIG. 5(a) shutter, FIG. 5(b) illustrating the shutter in extended state when a voltage is applied to the circuit member and the piezoelectric member.

FIG. 6 is an enlarged side cross-sectional view of a pixel aperture and corresponding piezoelectric shutter according to FIGS. 1–3.

FIG. 7(a) is a side elevational view illustrating the shutter of FIG. 6 closing the pixel aperture when voltage is applied thereto.

FIG. 7(b) is a side elevational view illustrating the shutter of FIG. 6 in the opened position (i.e. a voltage below the threshold voltage is applied thereto) so that light is permitted to pass through the pixel aperture.

DETAILED DESCRIPTION OF CERTAIN EMBODIMENTS OF THIS INVENTION

Figure 3:
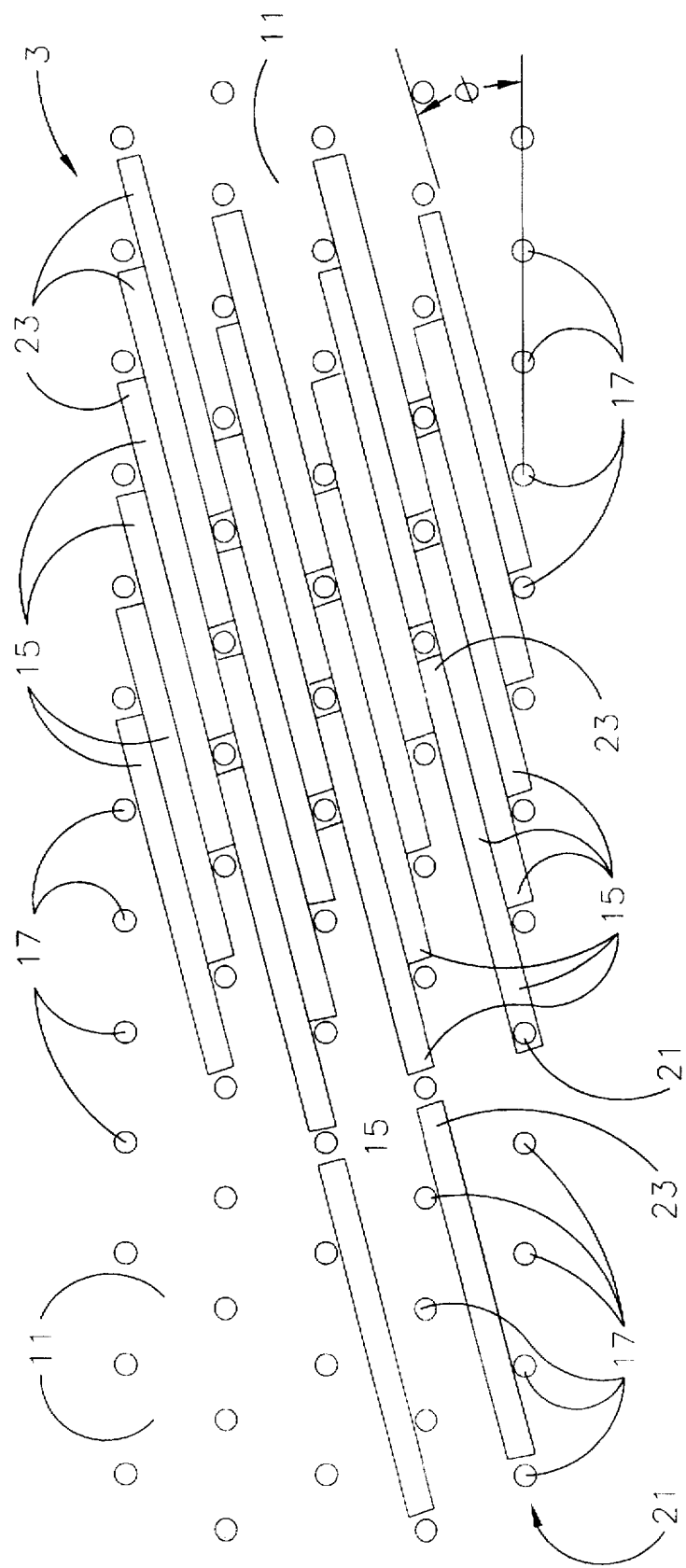
FIG. 3 is a top elevational view of the FIGS. 1–2 device, FIG. 3 illustrating an array of the pixel apertures and a corresponding array of piezoelectric shutters for opening/closing the apertures.

Referring now more particularly to the accompanying drawings in which like reference numerals indicate like parts throughout the several views.

FIG. 1 is a side cross-sectional view of light shutter device 3 according to an embodiment of this invention. As illustrated, light shutter device 3 includes light source 5 (e.g. fluorescent light source for emitting white light), metallic reflector 7 positioned behind the light source, and substrate 9 which supports or includes opaque portions 11, translucent or substantially transparent sections or voids 13, and opaque piezoelectric light shutters 15 which are laterally moveable in their respective planes so as to selectively open and close pixel apertures 17. Translucent areas 13 form the array of pixels in the device. Light shutter device 3 is a high density, transmissive type high resolution light modulator with the advantages of low manufacturing cost and small physical size. The low cost and small size are achievable in view of the fact that device 3 may be manufactured by way of photolithographic technology.

As illustrated, substrate 9 includes substantially transparent portions 13 which allow light to be transmitted from source 5, through pixel aperture 17, and thereafter through portions 13 to a screen to be seen by the viewer. Such a viewing screen (not shown) is disclosed and illustrated in U.S. Pat. No. 5,062,689, the disclosure of which is hereby incorporated herein by reference. Substrate 9 further includes opaque portions 11 which act to block transmission of light from source 5. Pixel apertures 17 are defined in substrate 9 between or within opaque portions 11. As shown in FIG. 3, pixel apertures 17 may be round in design while the remainder of substrate 9 is opaque and defined by portions 11. Substantially transparent portions 13 of substrate 9 may be made of glass or any other suitable material, or may be voids patterned in the substrate, these elongated portions 13 extending lengthwise across the entire substrate. Alternatively, round portions 13 and apertures 17 may simply be patterned in a metal substrate 9 via photolithography.

Device 3 may be used in flat panel display applications for laptop computers and the like. The overall thickness "d" of the device, shown in FIG. 1, is made up of essentially only substrate 9, light source 5, and reflector 7. This thin profile design of the system permits enhanced versatility with respect to different applications. The pitch "P" of the pixel apertures, shown in FIG. 1 as the distance between adjacent apertures 17, is a function of the particular use of device 3. For example, the pixel aperture pitch may be from about 0.1 mm up to about 0.28 mm.

Piezoelectric and opaque light shutters 15 are provided on the substrate 9. Each pixel aperture 17 is provided with a corresponding piezoelectric shutter 15 which functions to selectively open and close the opening 17. As illustrated in FIG. 1, of the four pixel apertures 17 shown, the middle two are in an open state permitting transmission of light from source 5 therethrough, while the two end apertures 17 are closed by their respective shutters 15 thereby preventing light from the source 5 from making its way into pixel portions 13 adjacent the closed apertures.

FIG. 2 is a side cross-sectional view of the FIG. 1 light shutter device 3. FIG. 2 differing from FIG. 1 in that small dots are provided in FIG. 2 for illustrating the presence of light rays originating from source 5. As shown in FIG. 2, the light rays from source 5 proceed toward substrate 9 and make their way through the two open central apertures 17 and into the adjacent transparent portions 13 because the shutters 15 for the two central opening 17 are in their contracted and opened states. Thus, the light rays flow through the two central transparent portions 13 shown in FIG. 2 to the screen. On the other hand, because the light shutters 15 provided for the two end apertures 17 are closed covering up their respective apertures 17, the light from source 5 is not permitted to make its way through these closed apertures and therefore there is no light presence within transparent portions 13 adjacent the closed apertures 17. Accordingly, the central pair of pixels in FIG. 2 is illuminated with white light while the two end pixels are in their darkened states because their apertures are closed or blocked off.

FIG. 3 is a top elevational view of device 3 illustrating the array of pixel aperture 17 and corresponding array of piezoelectric elongated light shutters 15, the aperture being arranged in a 60° alignment. As illustrated, apertures 17 may be round/circular, or alternatively may be of any other suitable shape such as triangular, square, etc. An elongated opaque shutter 15 is provided for selectively opening and closing each aperture. Shutter 15 takes up the majority of surface space on the substrate. All apertures 17, shown in FIG. 3, are open except for apertures 21. Apertures 21 are closed because their respective piezoelectric opaque shutters 15 are in their extended states covering up these apertures 21. As shown in the FIG. 3 design, angle Θ may be about 13.9°. According to different embodiments of this invention, Θ may be from about 12° to 20° depending upon the particular application or design of the pixel array.

Piezoelectric light shutters 15 each include a fixed end 23 which is permanently affixed in a single position to substrate 9 adjacent an opaque area 11. Because each shutter 15 is piezoelectric, when a voltage is applied to the conductive shutter, such a voltage causes each shutter 15 to extend from a contracted position (i.e. original length) to an extended position. In other words, the length of shutter 15 becomes greater when a voltage greater than $V_{th}$ is applied thereto. For example, referring to FIG. 2, shutters 25 (no voltage or a voltage below the threshold voltage $V_{th}$ applied) are in their contracted positions, while shutters 27 are in their extended positions ($V>V_{th}$ applied). In this particular embodiment, when the shutters 15 are extended (27), this results in the closing of the corresponding pixel aperture 17, while when the shutters are contracted (15) this results in the corresponding aperture 17 being opened.

FIGS. 4(a)–4(c) illustrate a piezoelectric opaque shutter 15 according to certain embodiments of this invention, with the FIG. 4(a) being a side elevational view and FIGS. 4(b)–4(c) being top views. As shown in FIG. 4(a), elongated shutter 15 includes end 23 which is affixed to substrate 9, and extendable end 27 which moves laterally back and forth across the corresponding aperture 17. Shutter 15 includes elongated piezoelectric opaque portion 29 (e.g. made of a known piezoelectric ceramic material) and conductive circuit member 31. Both fixed end 23 and control or extendable end 27 are of conductive materials. Flexible conductive circuit 31 completes the circuit between fixed end 23 and control end 27. A conductive circuit (not shown) is also connected from the driving electronics or driving circuitry (not shown) to the fixed end 23. Such a circuit including the driving circuitry is disclosed in the '689 patent, incorporated herein by reference.

FIGS. 4(a) and 4(b) illustrate shutter 15 in its contracted state (i.e. the corresponding aperture 17 is open according to the FIGS. 1–2 embodiment), while FIG. 4(c) illustrates shutter 15 in its extended state (i.e. control end 27 covers the corresponding aperture 17 thereby closing it). When a voltage potential is applied across shutter 15 from end 23 to end 27, this potential causes piezoelectric element 29 of the shutter to extend laterally in its plane thereby causing end 27 to cover the corresponding aperture 17. Because end 23 is fixed to substrate 9, the voltage across member 29 causes displacement only of control end 27 relative to the substrate. When this voltage potential is removed from element 29, the shutter 15 returns to its original or contracted, unstressed length with the corresponding aperture 17 being opened. As member 29 extends and contracts due to the voltage, so does flexible circuit 31 accordingly. As shown, conductive member 31 remains substantially flush with the top surface of member 29 at all times, with member 31 flexing in a zig-zag manner more in the contracted state than the extended state.

According to certain alternative embodiments of this invention, application of a voltage to a piezoelectric shutter 15 could be designed to open a corresponding aperture 17 as opposed to closing it as discussed above. In other words, voltage application to the piezoelectric shutter may function to either open or close the corresponding aperture via lateral shutter movement, depending upon the particular embodiment of this invention.

FIGS. 5(a)–5(b) are side elevational views of a piezoelectric shutter 15 according to another embodiment of this invention. This embodiment differs from the FIG. 4 embodiment in that flexible circuit 31 is bowed above the ceramic piezoelectric element 29 in the contracted state (FIG. 5(a)), and is substantially parallel to element 29 when a voltage greater than $V_{th}$ is applied to the shutter 15 and element 29 is in its extended state covering the corresponding aperture 17 (FIG. 5(b)). Also, the amount of voltage applied to member 29 via the driving circuitry may be adjusted in order to adjust the amount of light transmitted through the corresponding pixel.

FIG. 6 is a close-up side cross-sectional view of a particular pixel aperture 17 being closed or covered by an extended piezoelectric shutter 15. In this embodiment, voltage is applied across the piezoelectric element 29 by way of circuit 31 thereby causing the shutter to extend so that end 27 crosses over and covers aperture 17 thereby preventing light from passing therethrough.

FIGS. 7(a) and 7(b) are side cross-sectional views illustrating pixel aperture 17 being closed (FIG. 7(a)) and opened (FIG. 7(b)), respectively. Note that the fixed end 23 of shutter 15 remains in one position relative to the substrate while end 27 moves back and forth across aperture 17 to selectively open and close same as a function of voltage application across member 15. In order for the shutter 15 to completely close aperture 17, the shutter displacement when voltage is applied must be at least equal to distance "w", the diameter or size of aperture 17.

With respect to manufacturing, device 3 may be made by (i) providing substrate 9 including the transparent and opaque portions; (ii) forming the piezoelectric members on the substrate; and (iii) using photolithography to pattern the shutter 15 and drive circuitry on the substrate.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A piezoelectric transmissive light shutter device for controlling the transmission of light from a source through an array of pixel apertures, the piezoelectric light shutter device comprising:

a light source for emitting visible light rays toward the array of pixel apertures;

a substrate supporting a plurality of opaque portions for blocking light and the array of pixel apertures for transmitting light, each pixel aperture in the array being defined between or within at least one of said opaque portions;

an array of piezoelectric opaque light shutters, each shutter including piezoelectric means for moving laterally in its plane for selectively opening and closing a corresponding pixel aperture, one of said piezoelectric shutters being provided for each pixel aperture in the array so that light transmission from said source through a given pixel aperture is blocked when the corresponding shutter is in a closed position and permitted when the corresponding shutter is moved laterally in its plane to an opened position; and wherein each of said piezoelectric light shutters is selectively controlled between opened and closed positions by way of the selective application of voltage to each said light shutter.

2. The piezoelectric light shutter device of claim 1, wherein each of said piezoelectric opaque shutters is substantially planar in design.

3. The piezoelectric light shutter device of claim 2, wherein each of said piezoelectric opaque shutters is elongated in design and includes a conductive circuit member extending longitudinally from end to end, said voltage being applied to said circuit member causing said opaque shutter to extend lengthwise and close the corresponding pixel aperture.

4. The piezoelectric light shutter device of claim 3, wherein when each opaque shutter is in its contracted or non-voltage-applied state, the corresponding pixel aperture is open and light transmission is permitted therethrough, and when each opaque shutter is in its extended or voltage-applied state, the corresponding pixel aperture is closed and light transmission therethrough is blocked.

5. The piezoelectric light shutter device of claim 4, wherein the circuit member of each opaque shutter is bent or curved when the opaque shutter is in its contracted state, and substantially straightened when said opaque shutter is in its extended state.

6. The piezoelectric light shutter device of claim 1, wherein each of said opaque portions supported by said substrate is triangular-shaped in cross-section, with said pixel apertures being defined between adjacent base portions of said triangular-shaped opaque portions.

7. The piezoelectric light shutter device of claim 6, wherein the apex of each triangular-shaped opaque portion faces a viewing screen to be seen by a viewer so that divergent rays which pass through the light shutter device impinge upon said screen.

8. The piezoelectric light shutter device of claim 1, further including drive circuit means for selective energizing individual opaque shutters so that pixel apertures in the array may be selectively opened and closed independent of other apertures.

9. The piezoelectric light shutter device of claim 8, wherein said drive circuit means includes on said substrate one of (i) a diode based switching array; (ii) a transistor based switching array; and (iii) a flip-flop based switching array, for selectively applying voltage to said piezoelectric opaque shutters.

10. A piezoelectric-actuated array of light shutters comprising:

an array of pixel apertures defined in or on a substrate;

piezoelectric shutter means operatively associated with each pixel aperture in said array; and wherein said piezoelectric shutter means for each aperture includes a planar opaque member for moving laterally back and forth upon receiving application of a predetermined voltage so as to selectively open and close the corresponding pixel aperture, respectively.

11. The array of light shutter of claim 10, wherein each of said piezoelectric shutter means includes an elongated conductive circuit means extending from end to end of the shutter means.

12. The array of light shutter of claim 11, further including driving circuit means, and wherein said driving circuit means and said piezoelectric shutter means are mounted on said substrate.

* * * * *